G. Ambrose.
Elevators.
No. 3,596. Reissued Aug. 17. 1869.
Fig. 1
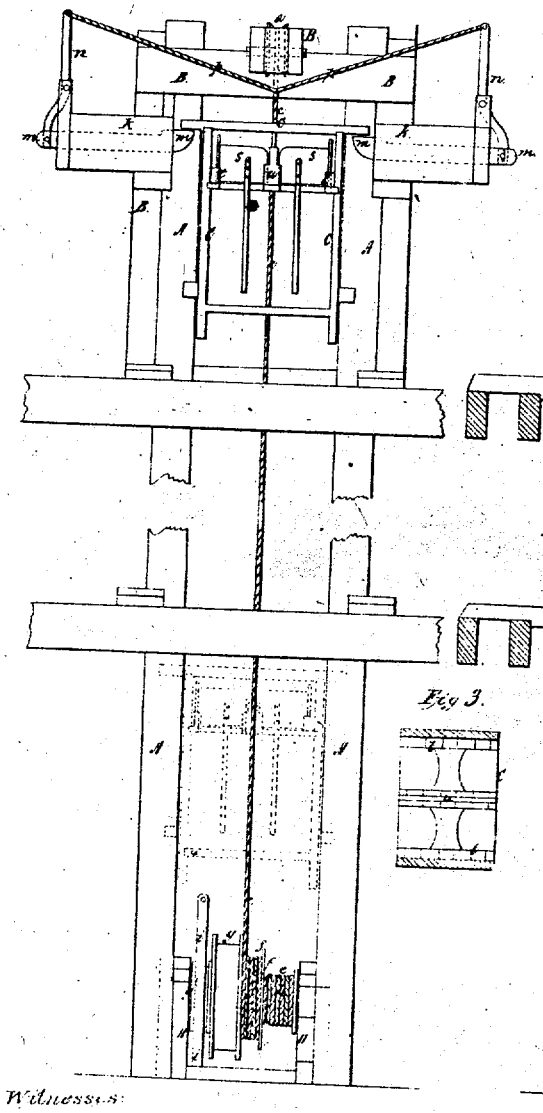
Fig. 2.
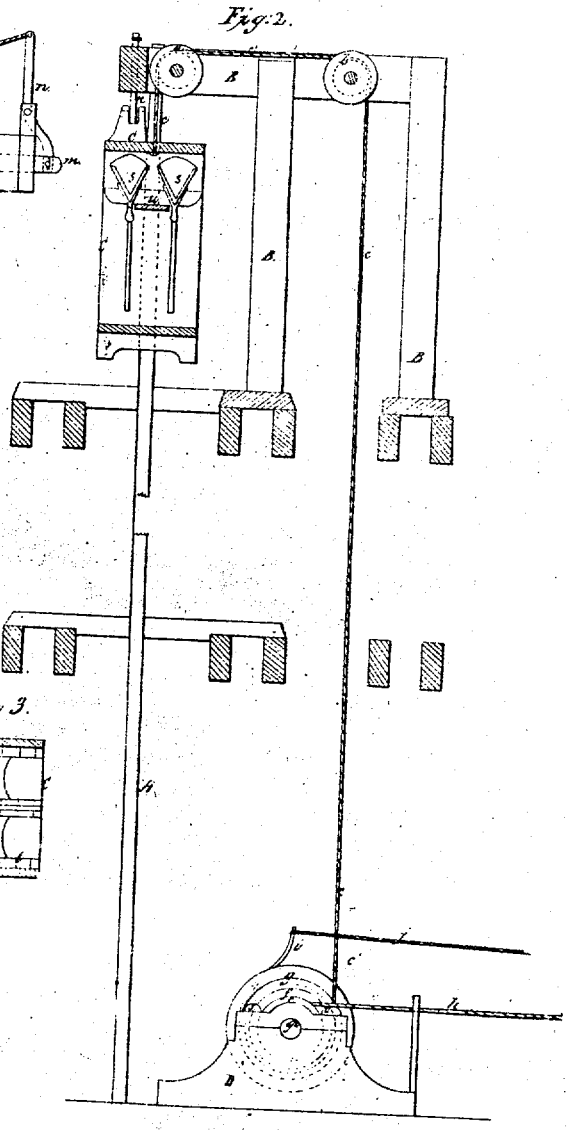
Fig. 3.
Witnesses:
R. T. Hamblen
E. Mayer
Inventor
Geo. Ambrose
by his Atty.
Mason Fenwick & Lawrence

United States Patent Office.

GEORGE AMBROSE, FOR HIMSELF, AND EDWARD HAGAN, ASSIGNEE OF GEORGE AMBROSE, OF NEW YORK, N. Y.,

*Letters Patent No.* 47,782, *dated May* 23, 1865; *reissue No.* 3,596, *dated August* 17, 1869

IMPROVED HOISTING-APPARATUS.

The Schedule referred to in these Letters Patent and making part of the same.

*To all whom it may concern:*

Be it known that GEORGE AMBROSE, of New York, in the county of New York, and State of New York, hath invented a new and improved Hoisting-Apparatus; and we, GEORGE AMBROSE and EDWARD HAGAN, of the same place, assignees of the said GEORGE AMBROSE, do hereby declare that the following is a full, clear, and exact description thereof, which will enable others skilled in the art to make and use the same, reference being had to the accompanying drawings, forming part of this specification, in which—

Figure 1 is a front elevation of the improved hoisting-apparatus.

Figure 2 is a vertical transverse section of the same.

Figure 3 is a detail horizontal section of the elevator or hod-rack.

Similar letters of reference indicate corresponding parts.

This invention relates to a new and improved apparatus, which is adapted for elevating building-material from the street, or from a lower to an upper story of a building, in portable receptacles, and which is so constructed that the laborious part of the operation can be performed by horse or steam-power, as will be hereinafter described.

Another object of the invention is, to so apply an elevator or hod-rack, which is adapted for receiving portable receptacles or hods, to an elevating-apparatus, that said rack will be automatically caught and retained in an elevated position when carried up to its fullest extent, as will be hereinafter described.

In the accompanying drawings—

A A represent two vertical guides or posts, which are sustained in an upright position by means of the floor-joists and cross-beams, which are secured thereto, or by other suitable devices.

The pivots may also be substituted by ropes that can be stretched in any suitable manner.

The upper ends of the guides A A are secured to a frame, B, which may be arranged to any one or two sheaves, *a b*, over which passes a rope or chain, *c*.

One end of said rope or chain is suitably connected to a hod-rack, C, which is, or should be, grooved at the ends to receive the edges of the guides A A, so that these guides will keep the rack in a proper horizontal position while it is being elevated or lowered.

The opposite end of said rope *c* is carried down and connected to a drum, *f*, which is hung or keyed to a shaft, $g^2$, that has its bearings in a frame, D, or in the lower parts of the posts, or in arms projecting therefrom.

This frame should be so constructed that it can be readily secured in place, and removed whenever it is found necessary.

A draught-rope, *h*, may be secured to a smaller drum, *e*, mounted on the shaft $g^2$, and is wound around it in such manner that when the rope is unwound, by means of a horse or otherwise, it will rotate the series shaft $g^2$, or at least the drum *f*, and wind up the rope *c*, upon its drum, *f*, thus elevating the hod-rack.

If it is desired to move the hod-rack very rapidly, the horse moving slowly, the rope *c* may be carried around a larger drum, *g*, arranged on $g^2$.

Another drum, $g^1$, on $g^2$, is intended to receive a brake-strap, *i*, to which a rope, *j*, is attached.

By pulling this rope *j*, the brake *i* can be drawm tightly about its drum, which will stop the hod-rack, either in its ascent or descent.

By means of this brake-arrangement, the attendant can stop the hod-rack at any desired height, or he can regulate its descent.

The arrangement for rotating the drum *f* or *g*, may be considerably varied, as any other suitable mechanism can be applied to the same purpose.

In fig. 2 is represented a counterweight, *c'*, applied to the rope *c*, for counterbalancing the weight of the hod-rack and its contents, and for thus relieving the horse of much of the weight of this hod-rack. Such counterweight may, however, be dispensed with.

At or near the upper end of the guides, and sustained by the frame B, are, or may be, two boxes, *k k*, arranged in a horizontal plan directly opposite each other.

These boxes contain spring-latches *m m*, which are actuated by levers *n n*, and a rope, *p*, as shown in fig. 1.

These latches have their noses or catching-ends so formed as to be thrust back by the projecting ends of the top of the hod-rack, when the latter is elevated to its fullest extent, and then to spring back under said projecting ends, thus catching and supporting the hod-rack in an elevated position.

When the cord *p*, which connects with the two latch-levers *n n*, is pulled, these latches will release the hod-rack, and allow it to descend.

The hod-rack itself may be a plain or other platform arranged in suitable manner, so that it will be adapted to receive and retain in place, suitable receptacles of bricks or mortar, or the brick, mortar, or other articles to be elevated or lowered, may be placed directly upon the rack.

That shown in the drawing, is adapted to receive the common portable hods *s s s s*, which are usually carried upon the shoulders of laborers.

In figs. 1, 2, and 3, are represented such hods applied to the rack C, in such manner that they can be readily removed therefrom for filling or emptying.

The rack shown in the drawing, is constructed as follows:

*t t* are two horizontal ledges, secured to the sides of a box, C, and notched to receive and support one end of the hods.

Between these two ledges *t t*, is another ledge, *u*, which is notched on both sides, to receive the opposite ends of the hods.

The notches in the ledges are of a V-shape, and hence prevent the hods from tilting when seated in them, and at the same time allow the hods to be applied to or readily removed from the hod-rack. The said hod-rack may, however, be constructed in other suitable manner, as, for example, without a platform; and we do not confine ourselves to the form herein shown.

The apparatus is operated by revolving the shaft $g^2$, or, if the drum *f* is loose on it, the drum itself, thereby winding or unwinding the rope *c*, and lowering or raising the rack C.

The brake, when applied, may be used to stop the ascent of the elevator at any desired height.

The rope *c* need not necessarily be wound upon a drum, as it may be directly applied to the elevating or lowering-mechanism, or it may be pulled by hand, if desired.

What we claim, as the invention of GEORGE AMBROSE, and desire to secure by Letters Patent, is—

1. The upper catches, in combination with the hod-racks and frame all arranged with respect to each other, as and for the purpose specified.

2. Spring-latches *m m*, and levers *n n*, in combination with the guides A A, and elevator or hod-rack, C, substantially as described.

The above specification signed by us, this 24th day of February, 1869.

GEORGE AMBROSE.
EDWARD HAGAN.

Witnesses:
FRANK BLOCKLEY,
E. GREENE COLLINS.